United States Patent [19]
Kaufman

[11] 3,926,520
[45] Dec. 16, 1975

[54] SYSTEM FOR ELECTRONIC ADJUSTMENT OF EFFECTIVE CONTRAST RATIO IN PHOTOGRAPHIC REPRODUCTION

[75] Inventor: Irving Kaufman, Tempe, Ariz.

[73] Assignee: The United States of America as represented by the Secretary of the Air Force, Washington, D.C.

[22] Filed: July 12, 1974

[21] Appl. No.: 488,084

[52] U.S. Cl. .............. 355/80; 250/225; 340/173.2; 350/150; 355/68; 355/71
[51] Int. Cl.² ........................................ G03B 27/76
[58] Field of Search .................. 355/80, 67, 68, 71; 340/173.2; 350/150, 153; 250/237 R, 225

[56] References Cited
UNITED STATES PATENTS

| | | | |
|---|---|---|---|
| 3,521,954 | 7/1970 | French | 355/80 |
| 3,566,130 | 2/1971 | Aldrich et al. | 350/150 X |
| 3,574,458 | 4/1971 | French | 355/71 X |
| 3,598,471 | 8/1971 | Baldwin et al. | 355/71 X |
| 3,680,956 | 8/1972 | Custer | 355/80 X |
| 3,722,998 | 3/1973 | Morse | 355/80 X |
| 3,758,207 | 9/1973 | Letzer | 355/80 |

*Primary Examiner*—Richard L. Moses
*Attorney, Agent, or Firm*—Joseph E. Rusz; Julian L. Seigel

[57] ABSTRACT

A system for controlling the contrast of light intensities falling upon a photosensitive surface after being transmitted through a transparency. Polarized light passes the transparency to a partially silvered mirror which reflects a portion of the light to an array of photosensors and also transmits a portion of the light to a ferroelectric plate. The photosensitive array and the ferroelectric plate are simultaneously scanned. At each scanning position of the photosensitive surface an electrical signal is caused to be applied to the corresponding scanned position of the ferroelectric plate, the intensity being controlled by a variable amplifier. The controlled light passing from the ferroelectric plate is transmitted through a polarizer to the photosensitive surface.

9 Claims, 6 Drawing Figures

SYSTEM FOR ELECTRONIC ADJUSTMENT OF EFFECTIVE CONTRAST RATIO IN PHOTOGRAPHIC REPRODUCTION

BACKGROUND OF THE INVENTION

This invention relates to controlling the intensity of illumination passing through an area on a local basis, and more particularly to an electronic system for the control of contrast in photographic printing.

A technique that has been used in the production of photographic pictures for many years has been the use of papers of differing contrast. For example, for reproduction in black and white, for a highly contrasty negative that is to be printed so that the picture has normal contrast, No. 1 or No. 2 paper would be used. For a "Flat" negative, No. 4 or No. 5 paper would be desirable. Alternatively, it is possible to use just one grade of paper and a set of filters that changes the contrast. However, in this invention the need for different papers or filters is eliminated. This novel system could also have application in office duplicating machines with which satisfactory reproduction of several grey scales is sometimes difficult.

SUMMARY OF THE INVENTION

The present invention provides a method and system of control of the local exposure of a field that is to be reproduced by electronically controlling the light locally permitted to pass through a special filter which in this case is a transparent ferroelectric ceramic material, such as PLZT, a composition of lead, lanthanum zirconium and titanate. There are two methods in which the amount of light passing through a small spot of a thin plate of such material is controlled by the local electric polarization (i.e., dipole moment per unit volume). These methods are controlled scattering and controlled birefringence and have been discussed in the literature and are summarized in my patent application entitled, "SYSTEM FOR ADJUSTING INDIVIDUAL SENSORS IN AN ARRAY," filed on even date herewith.

It is therefore an object of this invention to provide a method and system of controlling the amount of illumination passing through an area on a local basis.

It is another object to provide an electronic method and system for adjusting the contrast on a photographic surface from light derived from a photographic transparency.

It is still another object to provide a method and system of obtaining photographs with the desired contrast from a negative that has a contrast that is too little or too great.

These and other objects, advantages and features of the invention will become more apparent from the following description when taken in conjunction with the illustrative embodiment in the accompanying drawings, wherein like reference numerals indicate like or corresponding parts in the several drawings.

DESCRIPTION OF THE DRAWINGS

FIG. 5b is an equivalent circuit of that shown in FIG. 5a.

DETAILED DESCRIPTION OF THE PREFERRED EMBODIMENT

Figure 1:
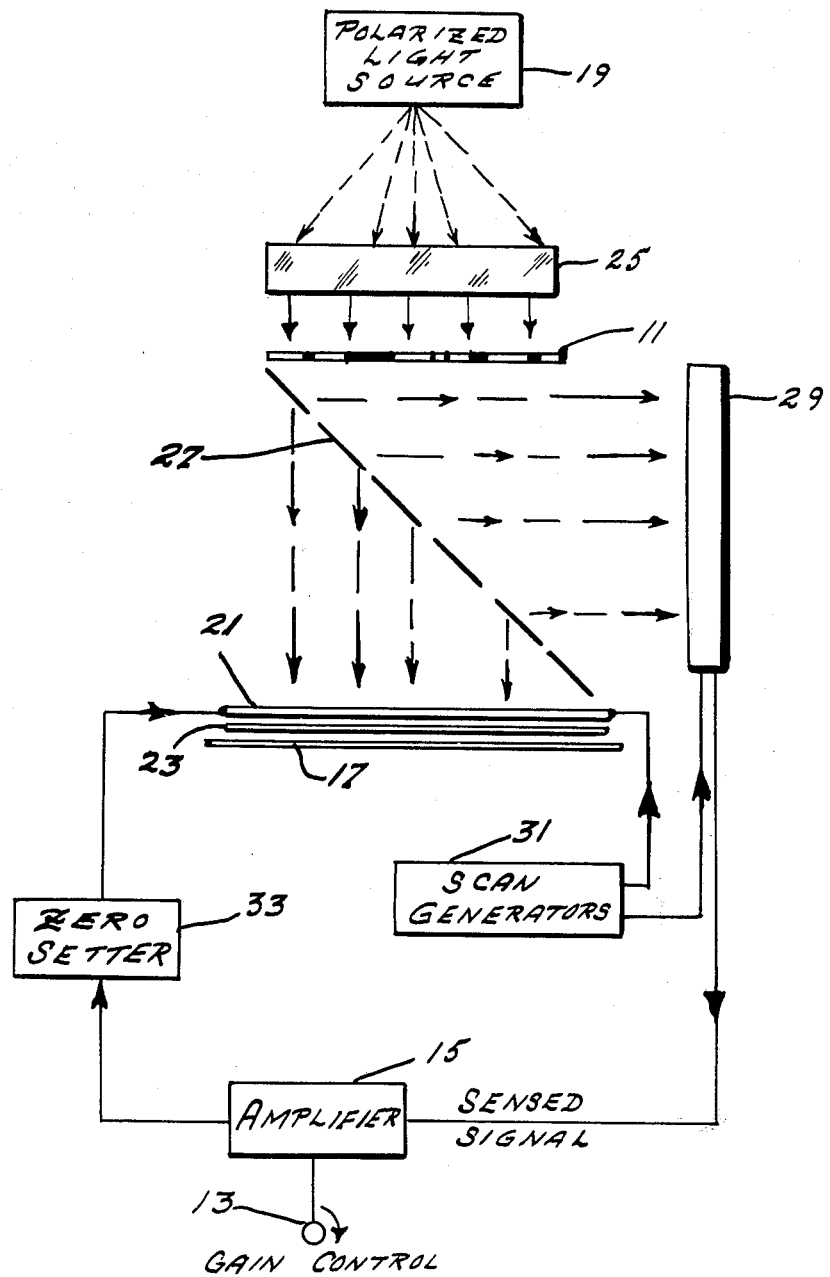
FIG. 1 is a schematic drawing showing an embodiment of the invention.

The system for using local control of light for photographic printing is shown in FIG. 1. A photographic print is produced from photographic transparency or negative 11. By adjusting the gain by control knob 13 of amplifier 15 the light that passes through to photographic paper 17 on which the image is to be printed is either intensified or attenuated. Contrary to the usual automatic exposure meter/printers in which the exposure time or $f$-stop of the focusing lens is set to produce optimum exposure that corresponds to the integrated light level, in the present invention, intensification or the attenuation is local. The intensification or attenuation is different throughout the various areas of the light field and depends on the density distribution of negative 11 throughout its area.

Figure 2:
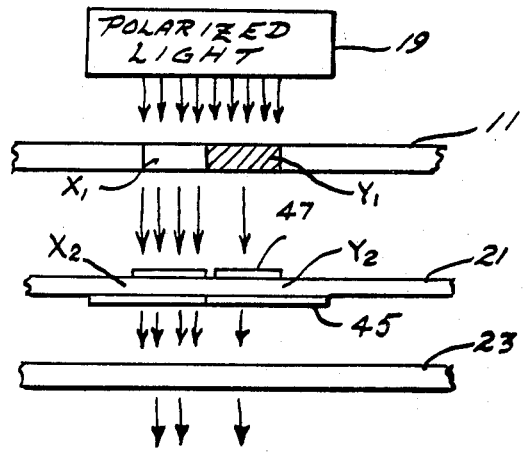
FIG. 2 is a schematic drawing of a detail of FIG. 1 showing how the PLZT plate varies the light passing through a transparency.

As an example, consider two adjacent areas $x_1$ and $y_1$ in transparent negative 11 as shown in FIG. 2. Here $x_1$ is very transparent and $y_1$ is grey causing only half of the incident light to pass through it as indicated by the quantity of arrows. Polarized light from source 19 passes through negative 11 and then through plate 21 of PLZT (a composition of lead, lanthanum, zirconium and titanate) which is a thin sheet of material in which the local electric polarization (dipole movement per unit volume) is altered. PLZT is commercially available and is manufactured by Honeywell.

As the polarized light from source 19 passes through plate 21 and polarizer 23, its output intensity is modulated and depends on the state of the polarization in regions $x_2$ and $y_2$, respectively. Consequently, by changing this material polarization in $x_2$ (by sequencing and applying local electric fields) the light passing out of spot $x_2$ can be of intensity that varies anywhere from that between $x_1$ and that entering $x_2$ to zero. Similarly, the light leaving $y_2$ can be of intensity from that entering $y_2$ to zero. The methods of altering polarization are well known and have been discussed in papers by Land and by Maldonado and Meitzler.

In order to enhance the contrast ratio, i.e., the ratio of intensities of light leaving $x_2$ and $y_2$, the intensities of the light distribution are monitored between negative 11 and plate 21 of the PLZT (point by point) by an optical-electrical system, such as a series of photosensors, which feed the electrical signals that correspond to the levels of light intensities through amplifiers (and possibly, pulse generators) to the localized areas of plate 21 of the PLZT. The polarizations are then modified, so that the ratio of light passed by area $x$ with respect to that passed by area $y$ is now greater than before the feedback procedure was applied.

To decrease the contrast ratio, the feedback is negative so that area $x$ transmits a smaller fraction of the light than it would have without the electrical feedback and area $y$ transmits a greater fraction of light than without the feedback.

When plate 21 is illuminated, lighter areas of the image such as $x_2$ have a larger voltage gradient than darker areas such as $y_2$. As a result, the transparency of the $x$-region is increased and that of the $y$-region decreased, thus increasing the contrast. If desired, the contrast may be decreased rather than increased by first polarizing the device by illuminating it uniformly and applying a large control voltage momentarily. The control voltage polarity is then reversed and the device illuminated with the desired image. Light areas such as $x_2$ then receive large reverse voltages, and decreased PLZT transparency relative to areas such as $y_2$ where smaller reverse voltages appear across PLZT plate 21 results.

Returning to FIG. 1 which implements the above principles in an actual photographic system, light from source 19 passes through diffuser or condenser lens 25 and then parallel light passes through photographic negative 11. By use of a reflecting surface such as a partially silvered mirror 27, a portion of this transmitted light is projected onto a plate or array of photosensors 29. The remaining light passes through the PLZT plate 21 and polarizer 23 to photographic paper 17.

The array of photosensors 29 could comprise a conventional vidicon camera or could also be solid state and electroded individually such as in a shift register so that each sensor, when scanned electrically, would generate a signal proportional to the level of its illumination. As photosensor array 29 is scanned, the various elements of PLZT plate 21 are scanned in synchronism, so that when a portion (or element) of photosensor array 29 is being interrogated, a corresponding element of PLZT plate 21 is connected to receive an electrical pulse that is a function of the signal output of the photosensing element. Simultaneous scanning of photosensor array 29 and PLZT plate 21 is controlled by scan generators 31. This electrical pulse will be of amplitude (or duration, or both) proportional to the amount of contrast desired, as set by the gain control knob 13 of amplifier 15 that amplifies the signal from the photosensing element of array 29. The amplitude of the electrical pulse is also proportional to the intensity of the signal from the specific element being interrogated or scanned. In this manner, the local polarization, therefore the local transmission of light through the system, is adjusted to determine the contrast of light impinging on the print.

A zerosetter 33 can be used to set the entire polarization of PLZT plate 21 to the same level before employing the contrast determining mechanism.

Figure 3:
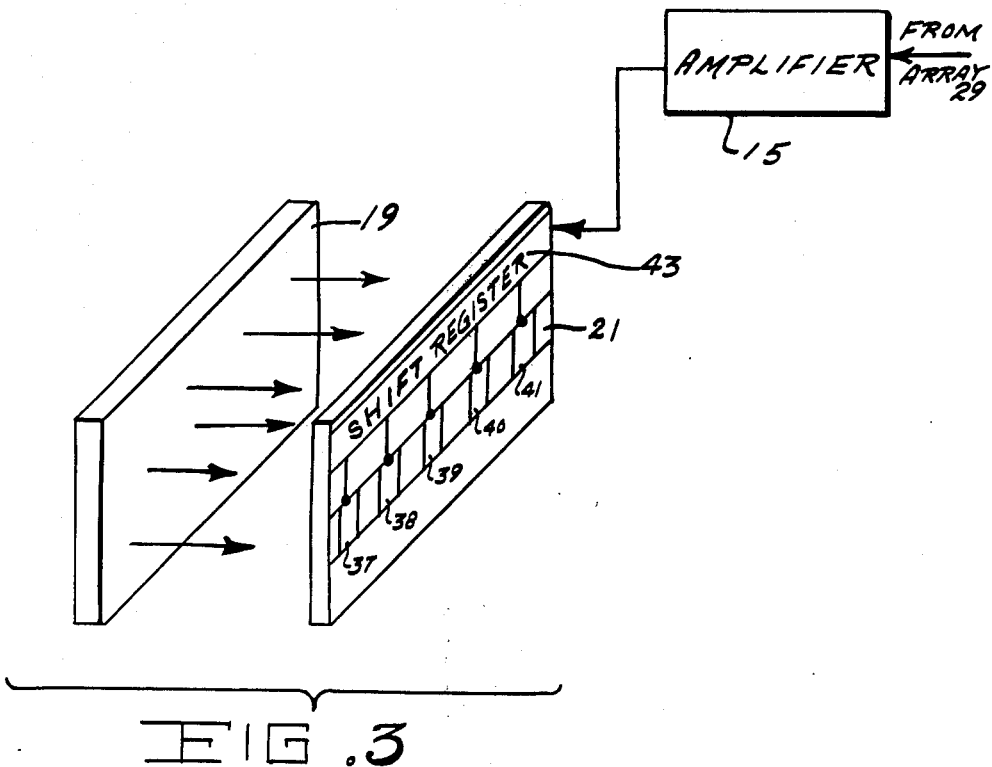
FIG. 3 is a schematic diagram describing the scanning of the PLZT with a shift register.

PLZT plate 21 can be scanned using a system of shift registers which can also be used to scan photosensor array 29 as an alternative to a vidicon or similar cathode ray tube scanning. FIG. 3 shows a simplified schematic for the use of the shift register. Polarized light from source 19 passes through PLZT plate 21 while transparent electrodes 37-41 cause PLZT plate 21 to be segmented into elements. Each of the electrodes are connected to shift register 43 which is fed by amplifier 15.

The shift registers can be single-pole, n-throw switches and can connect a single input to any one of n outputs of either a control pulse to an element of PLZT plate 21 or an element of photosensor array 29. These devices are common off-the-shelf devices, usually solid state electronic (Motorola, Texas Instruments) or fluidic devices (Corning). Selection of the desired output can be manual for low-speed applications, but is often automatic or sequential with the switch rate determined by a clock pulse as in computer memories. In the present case two-dimensional arrays would be used with x-y coincident addressing. Two shift registers per array would be needed, one to select row $x_j$ and the other to select column $y_k$ whenever the $j$-$k^{th}$ element is to be addressed.

In FIG. 2, electrode 45 on the lower surface of PLZT plate 21 may consist of stripes running perpendicularly to the stripes on upper surface 47. This permits the $x$-$y$ coincidence method of addressing.

Figure 4:
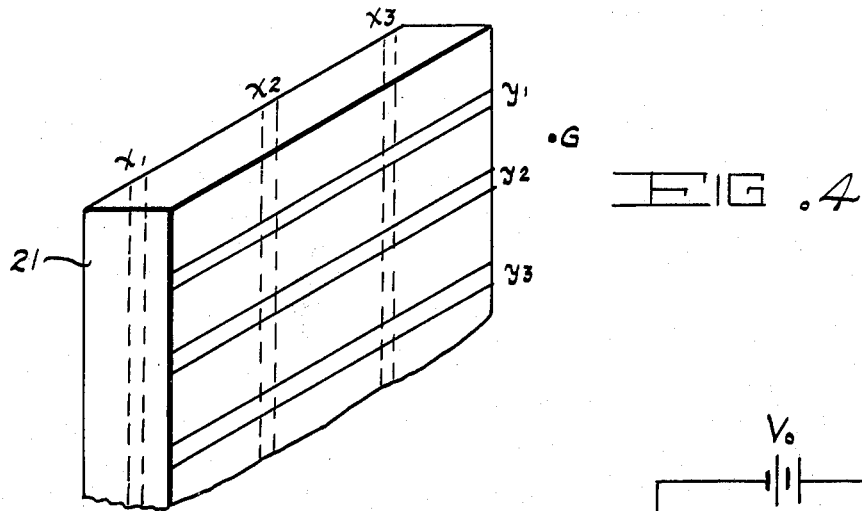
FIG. 4 is a diagram showing the strip method of addressing the ferroelectric material.

The present system for electronically adjusting the contrast ratio can be adapted to diminish the effect of cross talk. Referring to FIG. 4 which shows vertical transparent conducting strips $x_1$ $x_2$ $x_3$ . . . on one side of PLZT plate 21 and horizontal transparent conducting strip on the opposite side. Point G is a reference point. Assuming all $y$ lines except for $y_3$ and all $x$ lines except for $x_2$ are connected to point G and a voltage $V_o/2$ with respect to point G is applied to line $y_3$ and voltage $-V_o/2$ with respect to point G is applied $x_2$, then the voltage of $y_3$ with respect to $x_2$ is $V_o/2 - (-V_o/2) = V_o$. Consequently the transparency properties of the element between $y_3$ and $x_2$ can be changed. Since the voltage across most of the other electrodes is zero, those elements will not be affected. However, the elements under line $y_3$ and $x_2$ can be affected. Consider, for example, the element between $y_3$ and $x_1$. Since $V_{x_1} G = V_o/2$, we have $V_{y_3} \cdot x_1 = V_{y_3} - V_{x_1} = V_o/2$. Consequently, the element between $y_3$ and $x_1$ may also have its optical properties changed, though to a lesser extent.

There are several solutions to the above-stated difficulty.

If the function (effective transparency) vs. (applied voltage) is very nonlinear, the application of half-voltage (i.e., $V_o/2$ to an element such as that between $y_3$ and $x_2$, may change the effective transparency very little. (Ferroelectric ceramics do exhibit such nonlinearities.) This may be especially so when pulses are used. For example, it may be that 20 pulses of ($V_o/2$) may be much, much less effective than 10 pulses of $V_o$.

If, instead of connecting the strips of conduction material to point G, they are allowed to "float," the crosstalk may be lessened.

A film of transparent material whose resistivity is strongly voltage-dependent (for pulse-voltage application, a nonlinear dielectric could be of greater interest) could be interposed between the conducting strips and the ferroelectric material so that the ferroelectric material would have appreciable voltage applied across it only when the voltage is $V_o$ not $V_o/2$.

Figure 5A:
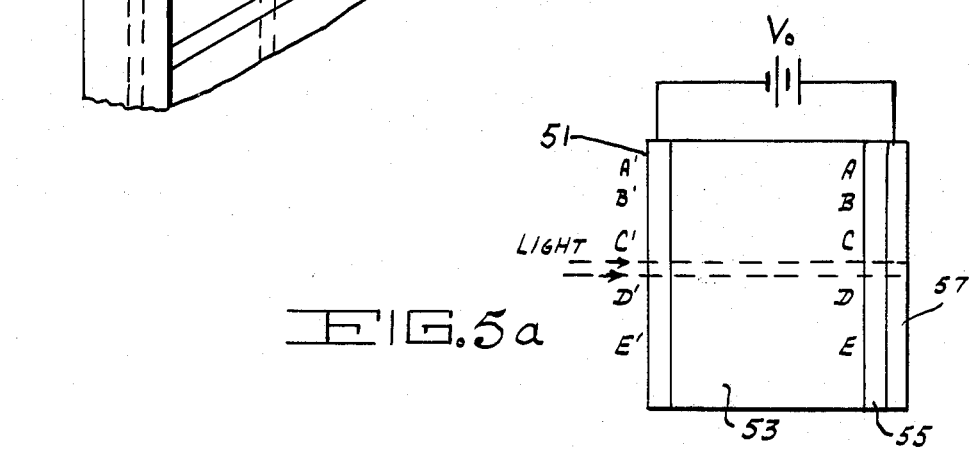
FIG. 5a is a diagram showing a system for decreasing cross talk.
Figure 5B:
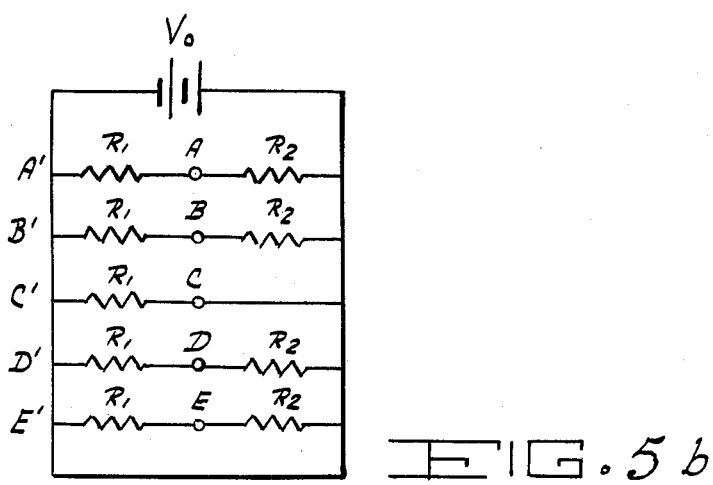

A layer of transparent, high resistivity photoconducting material could be interposed between the conducting strips and the ferroelectric material. (This has been done by Smith and Land, and others.) Instead of using steady illumination, as described by W. D. Smith and C. E. Land, Applied Physics Letters, Vol. 20, 4, 2/15/72, a light would be scanned across the array, so that the instantaneous location of the light spot is the same as the instantaneous location of the element that has the full voltage applied across it. Since the photoconductive layer is conductive only where illuminated, appreciable voltage would exist only across the ferroelectric element whose transparence is to be modified. This is shown in FIG. 5a where a beam of light passes through transparent conductor 51, through ferroelectric ceramic 53, and then through photoconductive layer 55 to transparent conductor 57. As shown, the light passes in the vicinity of the C - C' region. The equivalent circuit is shown in FIG. 5b where $R_1$ represents the resistance of the ferroelectric material and $R_2$ represents the resistance of the photoconductive layer. If $R_2 >> R_1$ appreciable voltage exists only across C - C'.

What is claimed is:

1. A system for controlling contrast of light passing through a transparency to a photosensitive surface comprising:
   a. a source of polarized light directed to the transparency;
   b. a plate of transparent ferroelectric material segmented into a multiplicity of elements positioned to receive the light emitted through the transparency;
   c. a polarizer interposed between the transparent ferroelectric material and the photosensitive surface said polarizer being adapted to intercept the light passing through the transparent ferroelectric material;
   d. a plane surface partially reflective and partially transparent positioned between the transparency and the ferroelectric material;
   e. an array of photosensors aligned to intercept the reflective light from the plane surface, the electrical output of the array being fed to the elements of the ferroelectric material; and
   f. a scan generator connected between the photosensitive array and the ferroelectric material for simultaneously scanning the output of the photosensors and the corresponding elements of the plate of ferroelectric material.

2. A system for controlling contrast of light according to claim 1 wherein the plate of ferroelectric material is a composition of lead, lanthanum, zirconium and titanate.

3. A system for controlling contrast of light according to claim 2 wherein the array of photosensors is a ridicon.

4. A system for controlling contrast of light according to claim 2 wherein the scan generator for the plate of ferroelectric material is a shift register having a multiplicity of stages.

5. A system for controlling contrast of light according to claim 3 which further comprises an amplifier having a gain control the amplifier being interposed between the array of photosensors and the plate of ferroelectric material.

6. A system for controlling contrast of light according to claim 4 which further comprises a condenser lens interposed between the source of polarized light and the photosensitive surface.

7. A system for controlling contrast of light according to claim 5 which further comprises a zero setting control interposed between the amplifier and the plate of ferroelectric material.

8. A system for controlling contrast of light according to claim 7 wherein the plane surface is a partially silvered mirror.

9. A system for controlling contrast of light according to claim 8 which further comprises a multiplicity of transparent electrodes connecting each of the elements of the plate of ferroelectric material to one each of the stages of the shift register.

* * * * *